Oct. 20, 1970  JAMES E. WEBB  3,534,555
ADMINISTRATOR OF THE NATIONAL AERONAUTICS
AND SPACE ADMINISTRATION
LAMINAR FLOW ENHANCEMENT
Filed March 6, 1968

INVENTOR.
RALPH A. AYVAZIAN
BY
Howard B. Scheckman
ATTORNEYS

United States Patent Office 3,534,555
Patented Oct. 20, 1970

3,534,555
LAMINAR FLOW ENHANCEMENT
James E. Webb, Administrator of the National Aeronautics and Space Administration, with respect to an invention of Ralph A. Ayvazian, Canoga Park, Calif.
Filed Mar. 6, 1968, Ser. No. 710,949
Int. Cl. F02k 9/00; F17d 1/16; R01f 17/42
U.S. Cl. 60—217                                                10 Claims

ABSTRACT OF THE DISCLOSURE

A method of improving the laminar flow of liquid coolants in rocket engines comprising reducing the fluid flow friction losses through adding a surface active agent for the liquid either directly to the liquid or by coating the walls of the chamber with the agent.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention is in the field of fluid flow and more particularly the invention pertains to a method for improving the laminar flow of fluids in contact with wall structures.

Description of the prior art

One of the known approaches for cooling rocket thrust chambers is known as filming cooling. In a typical application of film cooling, a portion of the injected fuel is directed against the inner walls of the thrust chamber forming a thin film thereon while in other applications, water or other coolant is separately sprayed against the walls of the chamber to provide such a coating. The thin films protect the chamber walls from burn out. To date there have been several problems with regard to achieving successful film cooling. The main problem resides in the inability to obtain an even, uniform film that is continuous along the walls of the chamber. The normal tendency is for the film to streak the walls providing an uneven coating and thus not achieve the desired end results. It is recognized that the quality of the heat transfer through the fluid depends on the laminar boundary layer of the fluid on the wall which is to be cooled. It is particularly due to this inability to achieve a good laminar boundary layer that the prior art often fails.

Another means for cooling rocket chambers is to pass the coolant, which once again can be the fuel itself in the regenerative situations or a disposable fluid such as water, through passages provided in the walls of the chamber. Here most of the problems are in achieving a sufficient flowrate of fuel or the flowing of coolant through the passageways at laminar conditions. The size of the passageways are limited by weight considerations and packaging. Thus within the limits of the rocket engine design it is desirable to achieve a greater flow of coolant yet maintain, as indicated, laminar flow conditions.

Thus, it is an object of this invention to provide a method for improving the film cooling of surfaces.

A further object of this invention is to provide a method for improving the flow of fluids in closed passages.

Still another object of this invention is to provide a method for reducing friction losses of fluids over surfaces.

Still another object of this invention is to provide a method for enhancing the laminar flow of fluids.

SUMMARY OF THE INVENTION

The above and other objects is accomplished by the utilization of a surface active agent, also known as a surfactant, compatible with the chosen liquid to coat the walls of the vessel or conduit which the primary liquid is to contact. The term surfactant refers to any material that will reduce the surface tension between the primary liquid and the walls which it will contact. For example, in a film cooling application the walls of the rocket chamber can be precoated with a surfactant material, preferably in a paste form prior to the injection of the fuel against the wall. Alternatively the surfactant agent can be sprayed onto the walls from a separate source simultaneously with the fuel or premixed with the fuel. When the fuel is waer miscible, then materials such as glycerine in a water solution can serve as a good surfactant to assure a film of the fuel on the walls. In a closed container such as recirculating tubes about a rocket chamber, the addition of a small amount of surfactant such as polyisobutylene in parts per million will reduce the wall friction. This of course enables a greater amount of fluid to pass through the lines at laminar flow.

It is believed that the invention will be better understood from the following detailed description and drawings in which.

Figure 1:
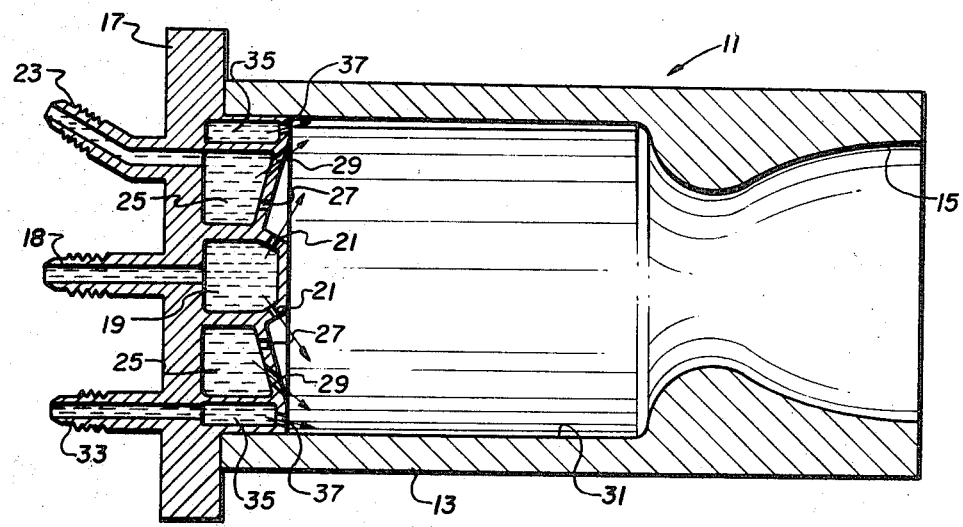
FIG. 1 is a cross-sectional view of a rocket engine utilizing film cooling of the inner walls.

Turning now to FIG. 1, there is seen a rocket engine 11 having a solid wall thrust chamber 13 which can be of a suitable material such as an ablative composition or refractory metal. A nozzle portion 15 is formed at the rear of the thrust chamber while the injector 17 is affixed to the forward end. In this type of a rocket chamber no means is provided to internally cool the walls 13 of the chamber. As a result film cooling is utilized. The liquid oxidizer is directed through a central inlet line 18 to a manifold 19. The liquid oxidizer then is directed outwardly from orifices 21 in a typically circular pattern. The fuel is admitted to the injector through a line 23 and fills a concentric manifold 25 above the manifold 19 for the oxidizer. The fuel is then directed outwardly through a first set of concentric orifices 27 so as to intersect the oxidizer stream and mix therewith. Additionally, the fuel is further directed out through a second set of orifices 29 which are angularly disposed so as to force the fuel against the inner walls 31 of the chamber to form a coolant film thereon.

In the course of the travel of the fuel along the inner walls 31 of the chamber the fuel will absorb heat while vaporizing and eventually will be burned off. The absorption of heat by the fuel will serve to act as a coolant to protect the walls. To date, this aforedescribed procedure has been the normal approach to film cooling. Both the oxidizer and fuel are pumped into a thrust chamber at extremely high pressures with resulting high velocities when passing through their injector orifices into the chamber portion. At these high velocities the fuel has a tendency to separate from the wall and streak so as to prevent a sufficient coolant film. Thus it is imperative when the fuels are used to cool the walls that no streaking or separation take place. In order to accomplish this a third inlet line 33 directs a surfactant composition through a concentric manifold 35 formed about the oxidizer manifold 25 in the injector. The surfactant solution then passes out through orifices 37 and is directed against the inner walls 31 of the chamber. If the conventional fuel is hydrazine, for example, a surface active agent that is miscible with water can be utilized since hydrazine itself is compatible with water. Thus the material in manifold 35 could comprise for example polyethylene oxide as a surfactant in a water solution. The surfactant solution may be injected only at the initial start of the engine so as to enable the fuel to initially lay down upon the inner walls 31 of the chamber in an even non-streaking film. Alternatively, the solution can be continually injected together with the fuel. The amount of the surfactant solution will not be too great since only approximately 10 to 100 parts per million of the surfactant to fuel or coolant is required in order to achieve the results of this invention and assure a film occurring. The particular arrangement shown in this figure prevents the fuel utilized for combustion purposes, namely that coming through orifices 27 from being affected by the addition of a surface active agent. Thus, the impulse performance of the rocket engine is not affected. However, most of the surfactants, particularly in the extremely small amounts required, will not affect the performance of the rocket engine. Thus in these instances the separate line 33 would not be required and the surfactant can be premixed in the small quantities required with the fuel itself.

It is to be understood that the amount of surfactant required will vary as to the material utilized and can be determined from relatively straight forward routine experimentation to determine the amount needed. Generally, the amount of a surfactant will be within the area of parts per million of the fuel used. As indicated, hydrazine, a very popular fuel, is miscible with water and thus a surfactant that is miscible with water would be utilized. For a hydrocarbon fuel, a surfactant such as polyisobutylene can be used in a carrier such as benzene. Once again the approach to determine the amount of surfactant necessary to achieve the results of this invention can be achieved through experimentation by slowly raising the slight amount of surfactant brought into line 33 to the point where streaking and spotting of the film of fuel is eliminated.

Figure 2:
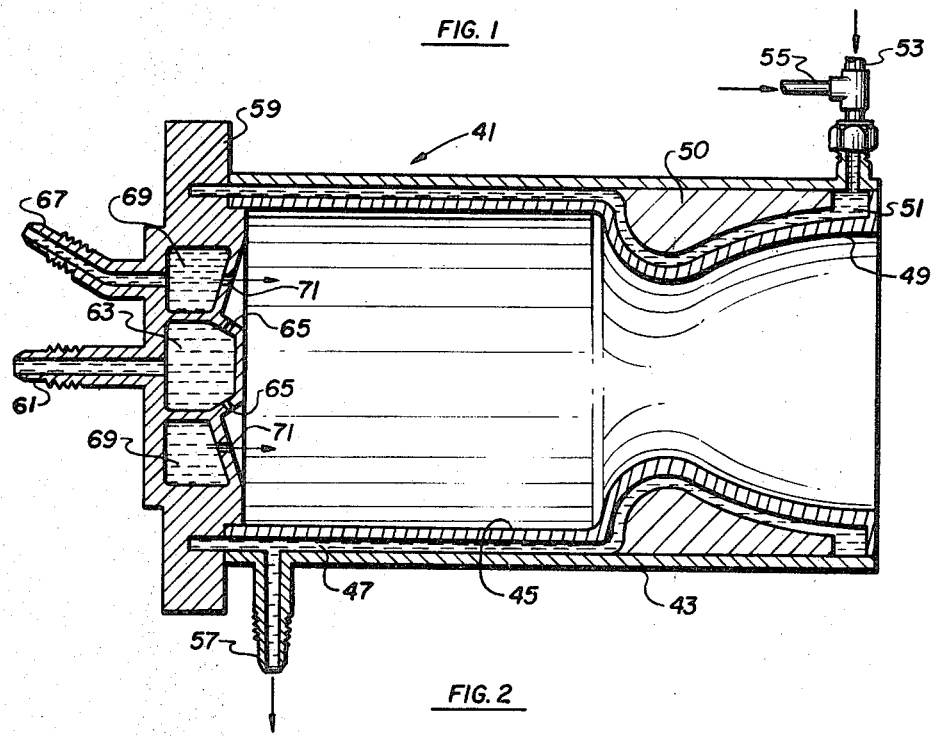
FIG. 2 is a cross-sectional view of a rocket engine having cooling passages in the walls thereof.

Turning to FIG. 2 there is seen the utilization of this invention in a rocket chamber wherein the walls of the chamber are provided with coolant passages. When a surfactant is added the fuel flow friction losses are reduced and increased flow rates are possible for a given available pressure. This can be explained by the following equations for circular ducts where fluid flow $\Delta P$ is given by the following equation:

$$\Delta P = 4f \frac{L}{D} \frac{V^2 \rho}{2 g_c}$$

where:
$f$ = wall friction factor
$\Delta P$ = pressure drop, lbs./ft.$^2$
$L$ = line length, ft.
$D$ = line diameter, ft.
$V$ = fluid velocity, ft./sec.
$g_c$ = gravitational constant, ft./sec.$^2$
$\rho$ = fluid density lbs./ft.$^2$ Thus, when for example, 10 parts per million of polyethylene oxide is added to a water coolant, the wall friction factor is reduced and the overall system pressure drop is reduced.

As seen in FIG. 2, a rocket engine 41 is comprised of an outer shell 43 and the inner shell 45 having a coolant passage or passages 47 therebetween. The inner shell 45 is formed with a nozzle 49 with a filler block 50 between it and the outer shell 41 in this region. The coolant passage 47 can comprise a singular annular jacket as shown, or a plurality of individual tubes carrying the coolant from a rear manifold 51 at the rear end thereof. The coolant is directed through line 53 to the rear manifold 51 while the addtive may intersect the coolant line 53 through a separate line 55 to mix with the coolant prior to entering the chamber. In this configuration the coolant will pass along the entire walls in passage 47 leaving the chamber through an exit line 57. An injector 59 is provided with an inlet 61 directing the fuel to a center manifold 63 and then outwardly through orifices 65. A second inlet 67 directs the oxidizer utilized to a second concentric manifold 69 and outwardly through orifices 71. The type of engine shown in FIG. 2 may utilize the coolant for that purpose only. However many rocket engines are designed utilizing what is termed regenerative cooling wherein the fuel is directed through the passageways along the length of the chamber prior to being injected for burning. The fuel exiting at 57 would thus be directed to enter the chamber at inlet 61. The temperature of a fuel is thus substantially raised prior to the injection into the combustion chamber. The principal of this invention can once again be used in order to achieve higher flow rates in the regenerative cooling passages upon adding a compatible surfactant agent to the materials providing the overall performance of the engine is not affected. As previously indicated, the small amount of surfactant required will not affect, in most instances, the performance of the engine.

As was pointed out, the mechanism involved in this invention through the addition of the surface agent is not well established. However, it is believed that the shear stress at the walls is reduced compared to solutions without the surface active additive. It is hypothesized that the additive causes molecular alignment at the wall in the shear direction and thus in turn the overall friction of the resistance of the wall to the movement of the fluid passage is likewise reduced.

In addition to the aforementioned surfactants, typical examples of water soluble agents include sodium alkylnaphthalene sulfonate, polyethylene glycol lauryl ether, sodium lauryl sulfate, sodium decyl benzene sulfonate and the like. Most of these surfactants can be combined with a suitable protein material such as a gelatin to form a paste suitable for applying a prior coating to the surfaces. When a paste coating is used, it should be apparent that the embodiments shown in the figures would not be required to bring the agent into the walled structures. Obviously, the paste coating is particularly applicable during short duration firings, since it degrades rapidly under operating conditions. However, the paste is also applicable to longer duration runs where it is particularly desired to provide a surface where the film can start evenly without streaking. Once a good film has started, its maintenance is more easily achieved. Further, some surfactants such as glycerine can be coated on a surface without forming a paste therefrom.

Most surfactants perform better when diluted in a suitable solvent therefor. Thus, as indicated in the aforegoing description, the surfactant is first diluted in a solvent prior to use in accord with the herein invention. This dilution is generally preferable whether the surfactant is injected separately as shown in FIG. 1 or is mixed with a coolant as in FIG. 2. Of course, when the coolant is a suitable solvent, such as water, then the surfactant is added directly thereto. Further, it is contemplated that a surfactant can be added directly to a fuel or other coolant without previous dilution if the surfactant will perform satisfactorily under this condition.

EXAMPLE

To demonstrate the effectiveness of the herein invention, a rocket engine for testing an injector design is constructed using plain steel wall construction for the chamber portion. This construction saves considerable cost for such test procedures. The walls of the chamber are cooled by providing a separate manifold surrounding the injector for dumping water into the chamber to form a film on the walls thereof. A 250,000-pound thrust engine using liquid oxygen and gaseous hydrogen can be fired for about only one-third of a second before burnout of the chamber. The water is fed in at the rate of 200 to 500 pounds per second. In such injector tests, it is desirable to achieve runs of at least one second. Thus, when the steel walls of the test chamber are previously coated with glycerine, the water adheres as a film thereto. Runs of one second duration then are achievable.

What is claimed is:
1. A method of cooling the walls of a liquid rocket engine chamber comprising:
   directing a liquid to said engine,
   directing said liquid along the walls of said chamber,
   providing a surface active agent for the liquid upon said walls in an amount sufficient to reduce frictional resistance of said walls to said liquid, said surface active agent being fully miscible in said liquid.
2. The method of claim 1 comprising:
   mixing said liquid with said surface active agent prior to said liquid entering said chamber.
3. The method of claim 1 wherein said liquid is the fuel for said engine comprising:
   injecting a portion of said fuel against the inner walls of said chamber to provide a film thereon.
4. The method of claim 3 additionally comprising:
   separately injecting said surface active agent against the walls of said chamber together with said fuel.
5. The method of claim 3 comprising:
   coating the inner walls of said rocket chamber with said surface agent prior to injecting said fuel.
6. The method of claim 4 comprising:
   directing said surface active agent against said walls concurrent with the start of said engine, and stopping the flow of said surface active agent after a coating has been deposited on said walls sufficient to reduce said frictional resistance.
7. The method of claim 1 wherein said surface active agent is polyethylene oxide.
8. The method of claim 7 wherein said polyethylene oxide is in a water solution.
9. The method of claim 3 wherein the amount of surface active agent is from 10 to 100 parts per million parts of fuel.
10. The method of claim 3 wherein said fuel is hydrazine and said surface active agent is polyethylene oxide.

References Cited

UNITED STATES PATENTS

| | | | |
|---|---|---|---|
| 2,821,205 | 1/1958 | Chilton | 137—13 |
| 3,169,368 | 2/1965 | Munding | 60—265 |
| 3,215,154 | 11/1965 | White | 137—13 |
| 3,307,567 | 3/1967 | Gogarty | 137—13 |
| 3,352,109 | 11/1967 | Lissant | 60—217 |
| 3,373,107 | 3/1968 | Rice | 137—13 |

DOUGLAS HART, Primary Examiner

U.S. Cl. X.R.

60—204, 258, 260; 137—13; 165—1; 252—352